(12) United States Patent
Wei

(10) Patent No.: US 10,080,465 B2
(45) Date of Patent: Sep. 25, 2018

(54) SHOWER DOOR ADJUSTING DEVICE AND SHOWER DOOR

(71) Applicant: Ideal Sanitary Ware Co., Ltd., Foshan (CN)

(72) Inventor: Wuxiang Wei, Foshan (CN)

(73) Assignee: Ideal Sanitary Ware Co., Ltd. (CN)

( * ) Notice: Subject to any disclaimer, the term of this patent is extended or adjusted under 35 U.S.C. 154(b) by 25 days.

(21) Appl. No.: 15/507,097

(22) PCT Filed: Jan. 11, 2016

(86) PCT No.: PCT/CN2016/070549
§ 371 (c)(1),
(2) Date: Feb. 27, 2017

(87) PCT Pub. No.: WO2017/120716
PCT Pub. Date: Jul. 20, 2017

(65) Prior Publication Data
US 2017/0360262 A1    Dec. 21, 2017

(51) Int. Cl.
*A47K 3/00*   (2006.01)
*A47K 3/34*   (2006.01)
(Continued)

(52) U.S. Cl.
CPC ............... *A47K 3/34* (2013.01); *E06B 1/045* (2013.01); *E06B 3/5454* (2013.01)

(58) Field of Classification Search
CPC .......... A47K 3/34; E06B 1/045; E06B 3/5454
(Continued)

(56) References Cited

U.S. PATENT DOCUMENTS

2013/0025232 A1* 1/2013 Wang .................. A47K 3/34
52/656.4
2013/0254984 A1* 10/2013 Perez .................. A47K 3/30
4/607
(Continued)

FOREIGN PATENT DOCUMENTS

AU          664659 B2    11/1995
CN        201786176 U    4/2011
(Continued)

OTHER PUBLICATIONS

International Search Report for Application No. PCT/CN2016/070549 dated Oct. 14, 2016.

*Primary Examiner* — Benjamin R Shaw
(74) *Attorney, Agent, or Firm* — Lerner, David, Littenberg, Krumholz & Mentlik, LLP

(57) ABSTRACT

The present invention provides a shower door adjusting device comprising a first side frame and a second side frame; a first fixing base assembly including a first fixing base and a second fixing base, wherein the first fixing base is fixed on the first side frame, the second fixing base is detachably fixed on the first fixing base, an installation groove is formed in the first and second fixing bases, and the first fixing base assembly is provided with a first through groove therein; a locking sheet whose end is provided with a boss, wherein the end of the locking sheet is installed in the installation groove, the locking sheet is provided with a first locking hole which faces the first through groove; a first connecting bar fixed to the second side frame and provided with a first rack passing through the first locking hole and the first through groove.

10 Claims, 12 Drawing Sheets

(51) Int. Cl.
*E06B 1/04* (2006.01)
*E06B 3/54* (2006.01)

(58) Field of Classification Search
USPC .............................................. 4/607
See application file for complete search history.

(56) References Cited

U.S. PATENT DOCUMENTS

| | | | |
|---|---|---|---|
| 2014/0115773 A1 | 5/2014 | Wei | |
| 2014/0237715 A1* | 8/2014 | Wei | A47K 3/30 |
| | | | 4/607 |
| 2014/0237903 A1* | 8/2014 | Wei | A47K 3/30 |
| | | | 49/504 |
| 2014/0250795 A1* | 9/2014 | Wei | A47K 3/30 |
| | | | 49/505 |
| 2014/0259367 A1* | 9/2014 | Taingtae | A47K 3/34 |
| | | | 4/607 |
| 2014/0331565 A1* | 11/2014 | Wei | E05D 11/0054 |
| | | | 49/505 |
| 2015/0096258 A1* | 4/2015 | Wei | A47K 3/36 |
| | | | 52/656.4 |
| 2015/0191962 A1* | 7/2015 | Wei | E06B 1/52 |
| | | | 49/505 |
| 2015/0191963 A1* | 7/2015 | Wei | E06B 1/52 |
| | | | 49/505 |
| 2015/0272397 A1* | 10/2015 | Wei | A47K 3/36 |
| | | | 4/614 |

FOREIGN PATENT DOCUMENTS

| | | |
|---|---|---|
| CN | 201850938 U | 6/2011 |
| CN | 202970320 U | 6/2013 |
| FR | 2693095 A1 | 1/1994 |

* cited by examiner

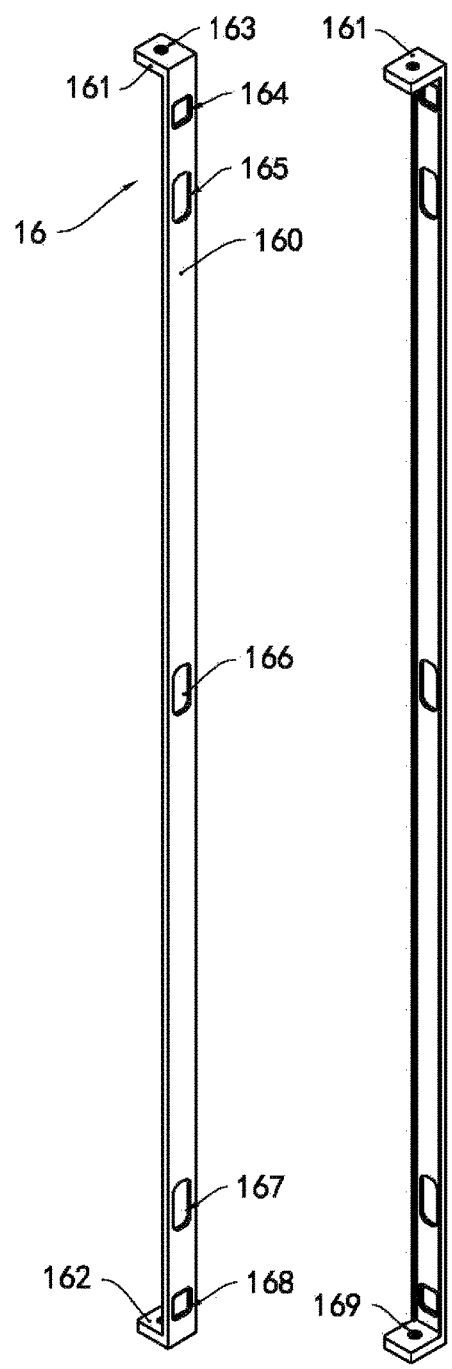
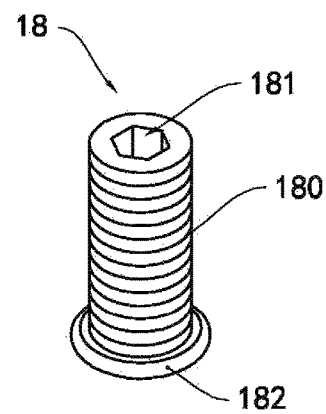
Fig. 13
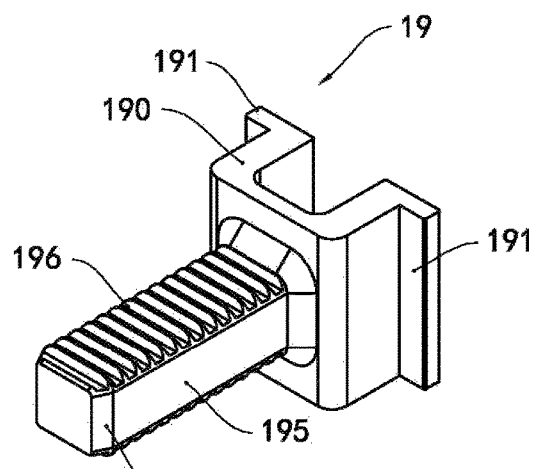
Fig. 14
Fig. 11  Fig. 12

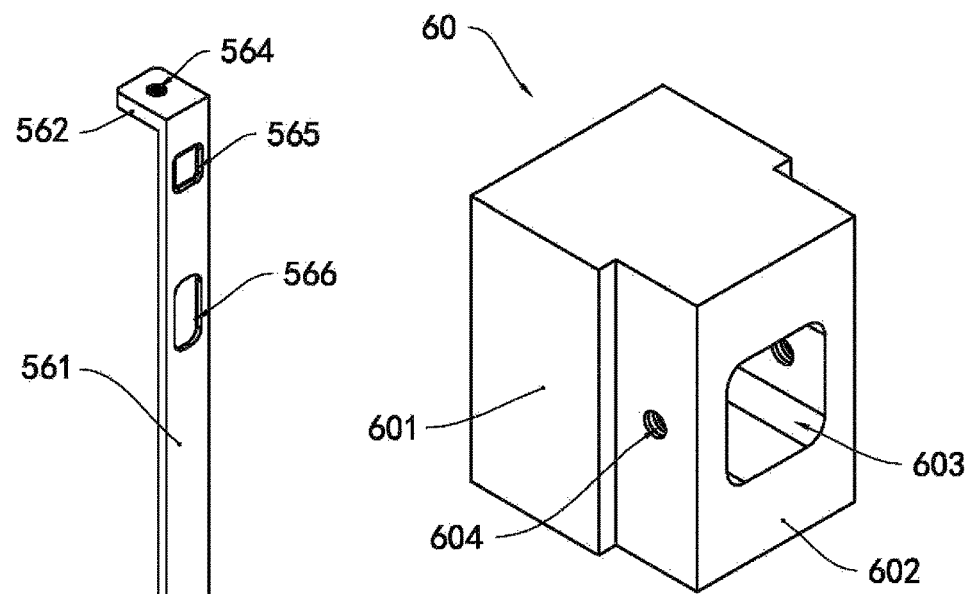
Fig. 25
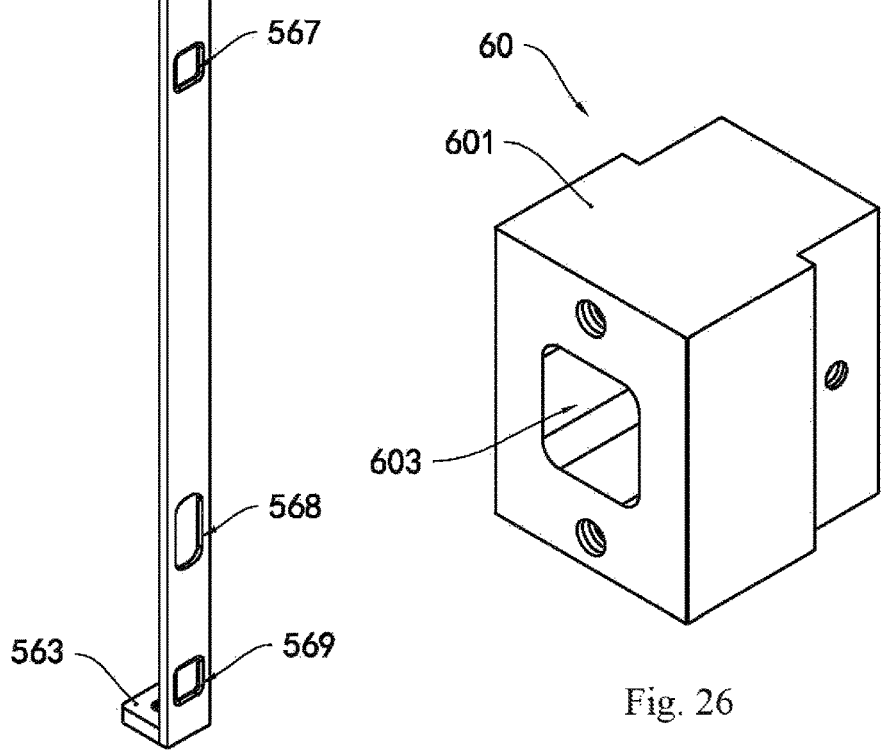
Fig. 26
Fig. 24

SHOWER DOOR ADJUSTING DEVICE AND SHOWER DOOR

CROSS REFERENCE TO RELATED APPLICATIONS

The present application is a national phase entry under 35 U.S.C. § 371 of International Application No. PCT/CN2016/070549, filed Jan. 11, 2016, which is incorporated herein by reference.

TECHNICAL FIELD

The present invention relates to the field of sanitary and bathing equipment, and particularly to a shower door installed in a shower room and a shower door adjusting device.

BACKGROUND ARTS

Today, people usually provide shower rooms in the bathrooms when performing decoration. Existing shower rooms usually use shower doors with glass panels. Most existing shower doors can be divided into two types, namely, sliding doors with tracks and hinged doors with hinges.

A sliding door has a frame made of metal. The frame includes one or two tracks provided at an upper end or a lower end of the shower door, and the track is arranged to be substantially parallel to the floor. Besides, an side frame is provided at both sides of the frame and is arranged to be perpendicular to the track, and the frame is fixedly connected to the track. The frame is provided therein with at least two glass panels, which may be movable glass panels capable of sliding back and forth in the track, and may also have at least one fixed glass panel that cannot slide relative to the track. If a fixed glass panel is provided, then the shower door includes at least one movable glass panel that can slide back and forth in the track.

A hinge door includes a metal frame within which a glass panel is provided. Usually, side frames are provided to the frame which is fixed to a wall; and a rotating shaft door including a glass panel is fixed to the side frames, such that the glass panel and the side frames are fixed. Usually, a rotating shaft is provided to the rotating shaft door, the glass panel is fixed to the rotating shaft, and the rotating shaft door can rotate around the rotating shaft to allow opening and closing of the rotating shaft door.

Since a shower door needs to be installed against a wall and needs to keep a vertical state after installation, but walls of buildings are usually not perpendicular with the ground, and an angle inclined inwards or outwards exists, if the shower door is installed completely along the walls, opening and closing of the shower door may be affected. Therefore, when installing the shower door, distances between the upper and lower ends of the shower door and the wall should be adjusted, so that the door is in the vertical state after installation.

To realize the adjustment of an installation angle of the shower door, an existing shower door is usually designed to include a fixed side frame to be fixed to a wall surface and a adjustable side frame to be connected with a glass panel and fixed to the fixed side frame by a connecting element. When installing the shower door, first the fixed side frame is fixed against the wall; then, the adjustable side frame is moved to approach the fixed side frame; distances between the upper and lower ends of the adjustable side frame and those of fixed side are adjusted, so that the adjustable side frame is in the vertical position, and the glass panel is also in the vertical position after installation; finally, holes are drilled on the adjustable side frame and the fixed side frame, and screws or the like are used to fasten the adjustable side frame and the fixed side frame.

However, when installing the fixed side frame and the movable frame of the shower door, drilling needs at least two people working together and consumes a long time; in addition, drilling may easily destroy side frame surfaces which are usually made of aluminum, so that the appearance of the product or even the whole adjustable side frame or fixed side frame is damaged, and the shower door cannot be used.

Technical Problems

To solve the above problems, the main object of the present invention is to provide a shower door adjusting device that can be installed conveniently and cannot be easily damaged.

Another object of the present invention is to provide a shower door that does not require drilling when installing the fixed side frame and the adjustable side frame.

Technical Solutions

To realize the above main objective of the invention, the invention provides a shower door adjusting device, which comprises: a first side frame and a second side frame, one of which is a fixed side frame and the other of which is an adjustable side frame; a first fixing base assembly including a first fixing base and a second fixing base, wherein the first fixing base is fixed on the first side frame, the second fixing base is detachably fixed on the first fixing base, an installation groove is formed between the first and second fixing bases, and the first fixing base assembly is provided with a first through groove therein; a locking sheet having an end provided with a boss, wherein the end of the locking sheet is installed in the installation groove, the locking sheet is provided with a first locking hole which faces the first through groove, a spring abutting against the boss is provided to the first fixing base assembly, the boss is provided with a threaded hole, a screw passing through the threaded hole is provided in the first fixing base assembly, and one end of the screw close to the first fixing base is provided with an abutting portion; and a first connecting bar fixed to the second side frame and provided with a first rack passing through the first locking hole and the first through groove, wherein the first rack is locked within the first locking hole after the abutting portion of the screw abuts against the first fixing base.

According to a preferred solution, the spring(s) is/are disposed above and/or below the boss of the locking sheet.

According to a further solution, there are two first fixing base assemblies, which are respectively disposed at upper and lower ends of the first side frame; and both ends of the locking sheet are respectively provided with one of the bosses, and two of the bosses are respectively disposed within the two of the first fixing base assemblies.

According to a yet further solution, the locking sheet comprises a first locking sheet and a second locking sheet which are respectively located at an upper end and a lower end thereof and are connected by a connecting member.

According to a yet further solution, at the middle of the first side frame is provided with a second fixing base assembly including a third fixing base and a fourth fixing base, wherein the third fixing base is fixed on the first side frame, the fourth fixing base is detachably fixed on the third fixing base, and the second fixing base assembly is provided with a second through groove; the middle of the locking sheet passes through the second fixing base assembly and is provided with a second locking hole facing the second through groove; and on the second side frame is fixed a second connecting bar, which is provided with a second rack passing through the second through groove and locked by the second locking hole.

According to a yet further solution, a top wall of the second fixing base is provided with a through hole, through which one end of the screw passes and which is in the shape of an inverted taper.

The shower door provided by the present invention comprises the above shower door adjusting device and a glass panel provided within the adjustable side frame.

Advantageous Effects

On the fixed side frame of the shower door adjusting device and the shower door of the present invention is fixed a first fixing base, and the locking sheet is fixed in the first fixing base assembly. When installing the shower door, the fixed side frame on which the first fixing base assembly and the locking sheet are provided is fixed to a wall surface, and a screw is screwed into a threaded hole so that the screw is located at the highest position. Then, the adjustable side frame on which the connecting bar is fixed is installed on the fixed side frame, and the rack of the connecting bar passes through the locking hole of the locking sheet. After the shower door is adjusted to the right position, the screw is rotated downwards. When the abutting portion of the screw abuts against the first fixing base, the boss of the locking sheet applies an upward force to the screw. When the screw is rotated continuously, the locking sheet moves upwards, the locking hole moves upwards accordingly, and the teeth of the rack are locked by the locking hole, so that the adjustable side frame is fixed on the fixed side frame.

Thus, during the installation process of the shower door, drilling on the fixed side frame is unnecessary, and damages to the fixed side frame can be prevented. The appearance of the shower door of the present invention will not be spoiled after installation, and the installation process thereof is very convenient.

In addition, when dissembling the shower door, it only needs to loosen the screw. The boss of the locking sheet springs upwards under the elastic restoring force of the spring, so that the rack can be plugged out conveniently and the adjustable side frame can be adjusted.

Further, a connecting member such as a steel wire is provided at the middle of the locking sheet to facilitate independent adjustment of the first and second locking sheets which are disposed in a vertical relation.

Further, at the middle of the shower door is provided with a second fixing base assembly, which can securely fix the adjustable side frame on the fixed side frame and prevent loosening of the adjustable side frame.

BRIEF DESCRIPTION OF THE DRAWINGS

FIG. 11 is a structural view of a locking sheet of a shower door according to the first embodiment of the present invention;

FIG. 12 is structural view of a locking sheet of a shower door according to the first embodiment of the present invention when seen from another view angle;

FIG. 13 is an enlarged structural view of a screw of a shower door according to the first embodiment of the present invention;

FIG. 14 is an enlarged structural view of a connecting bar of a shower door according to the first embodiment of the present invention;

FIG. 24 is a structural view of a locking sheet of a shower door according to the fifth embodiment of the present invention;

FIG. 25 is an enlarged structural view of a third fixing base of a shower door according to the fifth embodiment of the present invention;

FIG. 26 is an enlarged structural view of a third fixing base of a shower door according to the fifth embodiment of the present invention when seen from another view angle;

The present invention is described in detail with reference to the accompanying drawings and the embodiments.

EMBODIMENTS OF THE PRESENT INVENTION

Embodiment 1

Figure 1:
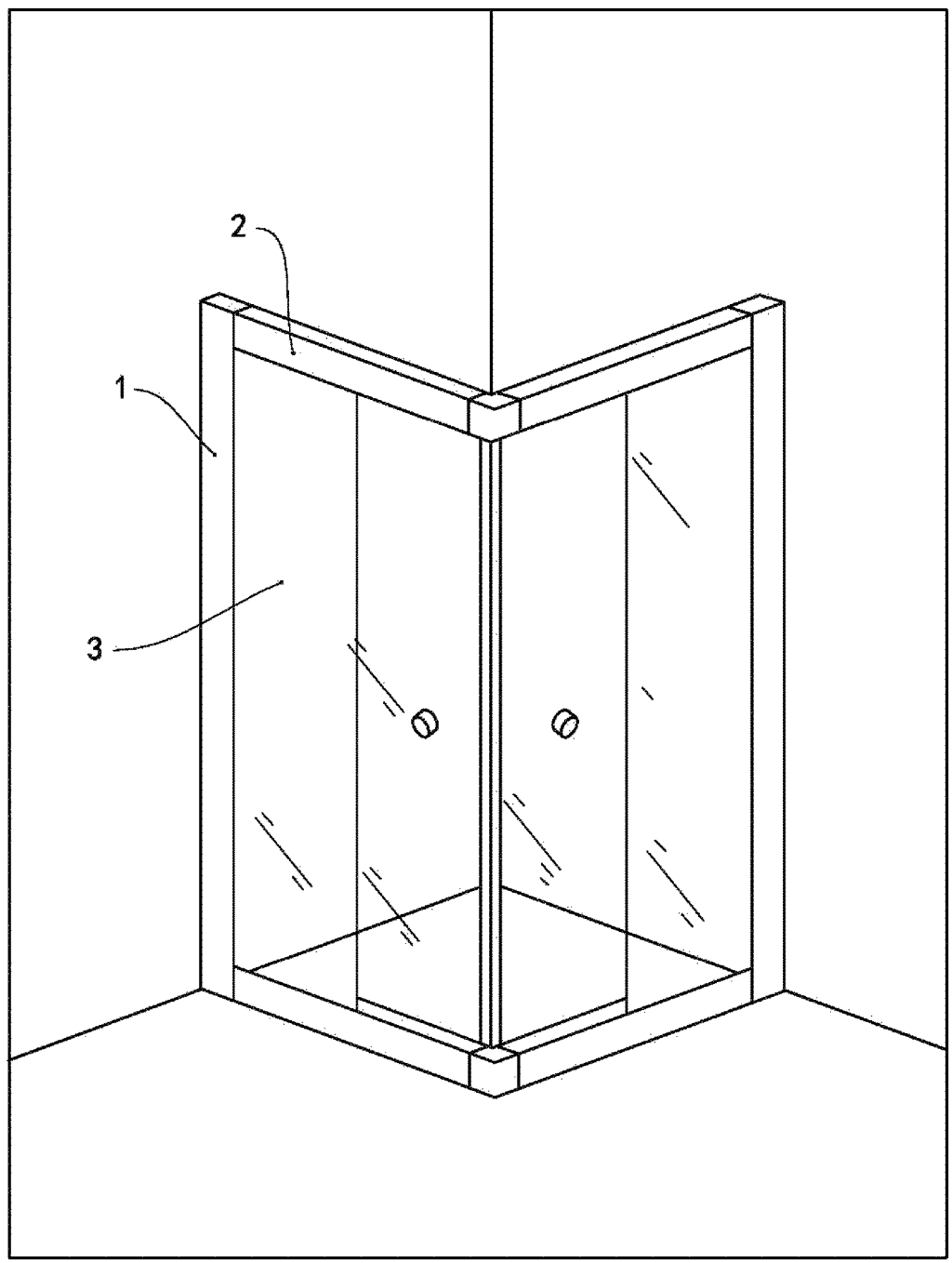
FIG. 1 is a structural view of a shower door installed in a shower room according to a first embodiment of the present invention.
Figure 2:
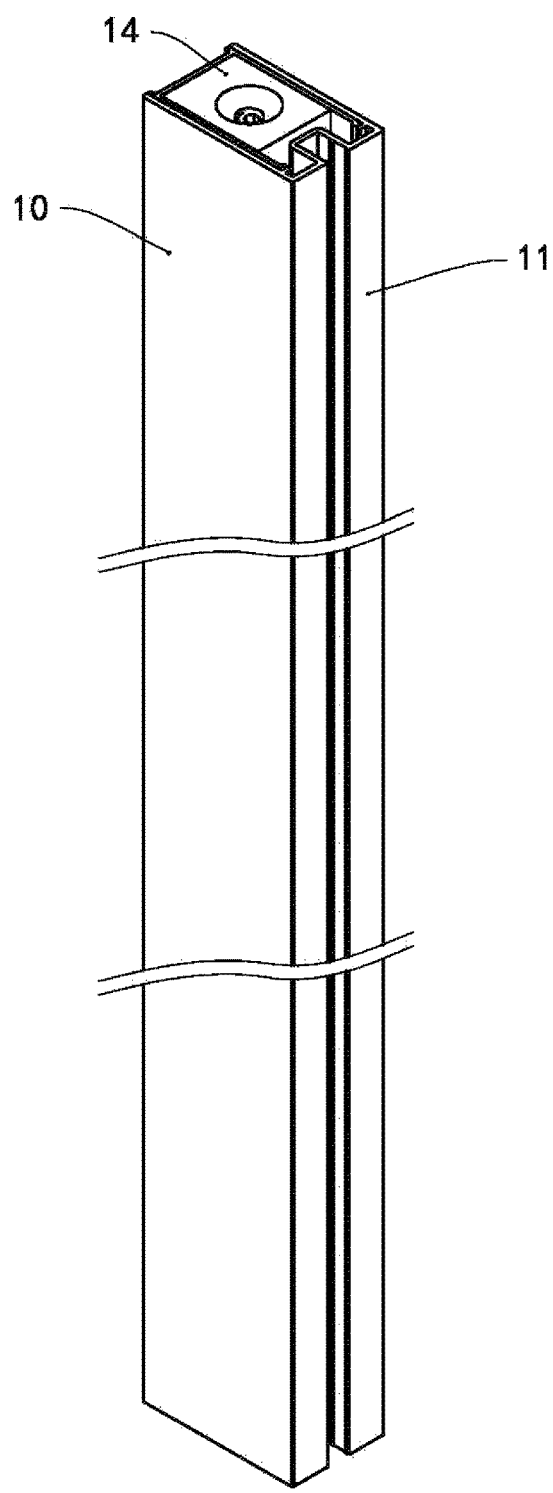
FIG. 2 is a structural view of a shower door according to the first embodiment of the present invention.
Figure 3:
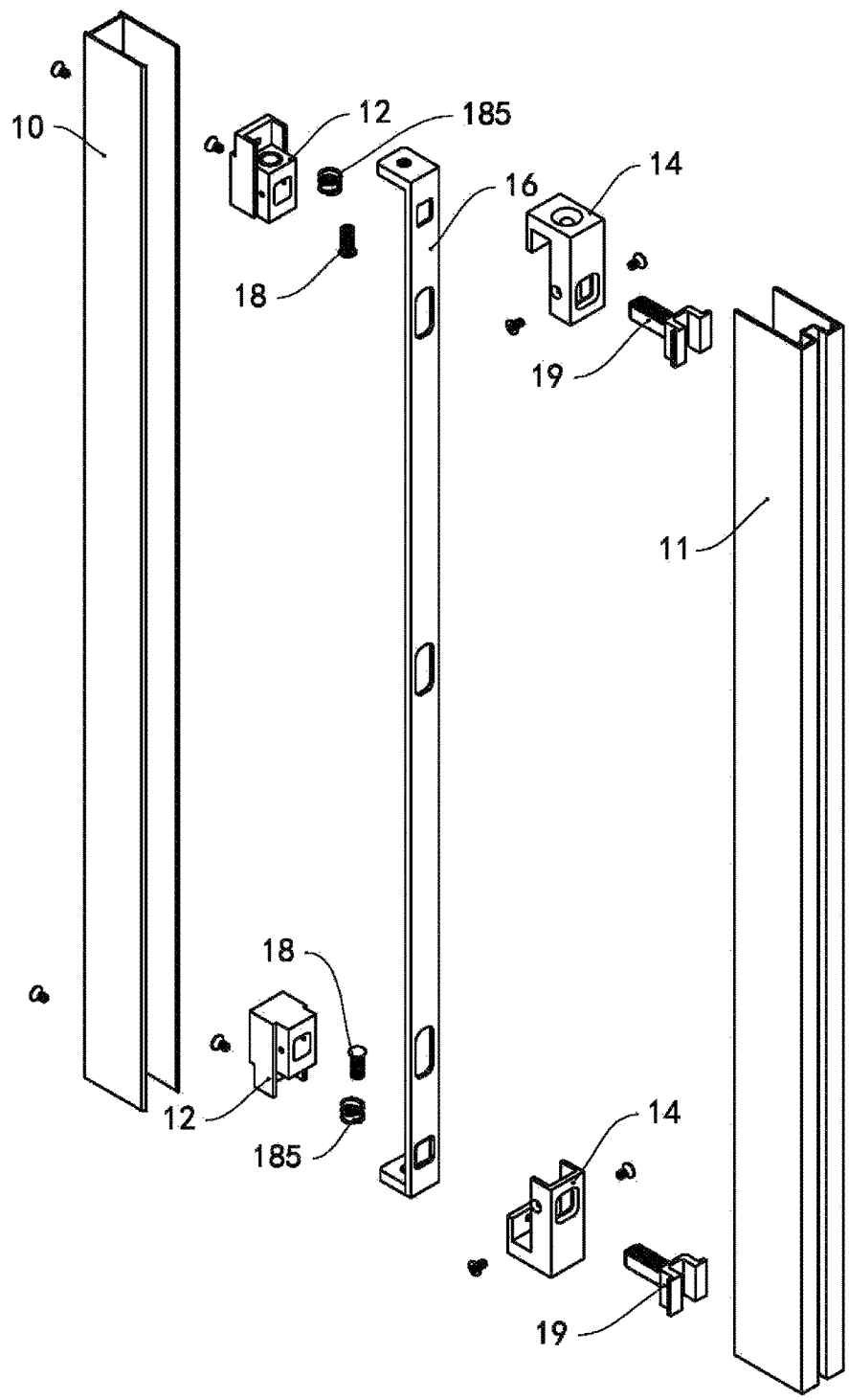
FIG. 3 is an exploded view of a shower door according to the first embodiment of the present invention.

The shower door of the present invention is installed in a shower room. Referring to FIG. 1, the shower door comprises a shower door adjusting device, in which a glass panel 3 is fixed. Referring to FIGS. 2-3, the shower door adjusting device comprises a fixed side frame 10 and an adjustable side frame 11 that are fixed on a wall surface. The adjustable side frame 11 is adjustably fixed on the fixed side frame 10, and the glass panel 3 is installed in the adjustable side frame 11. To realize fixing of the fixed side frame 10 with the adjustable side frame 11, fixing base assemblies are respectively provided at the upper and lower ends of the fixed side frame 10 and the adjustable side frame 11. Each fixing base assembly includes a first fixing base 12 and a second fixing base 14. The two ends of a locking sheet 16 are respectively installed in the fixing base assemblies at the two ends thereof. Each fixing base assembly is provided with a screw 18, and two connecting bars 19 are respectively inserted into the two fixing base assemblies.

Figure 4:
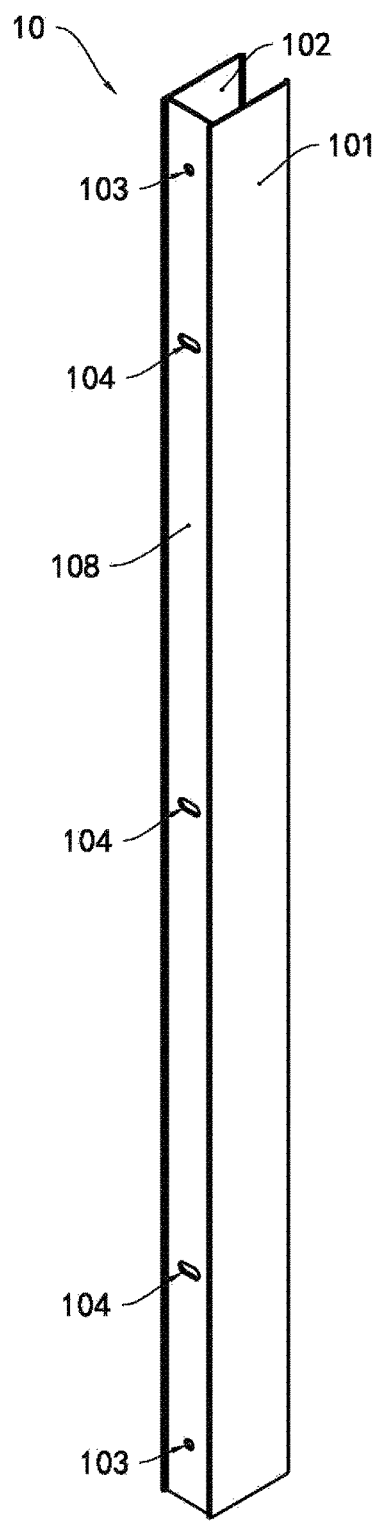
FIG. 4 is a structural view of a fixed side frame of a shower door according to the first embodiment of the present invention.
Figure 5:
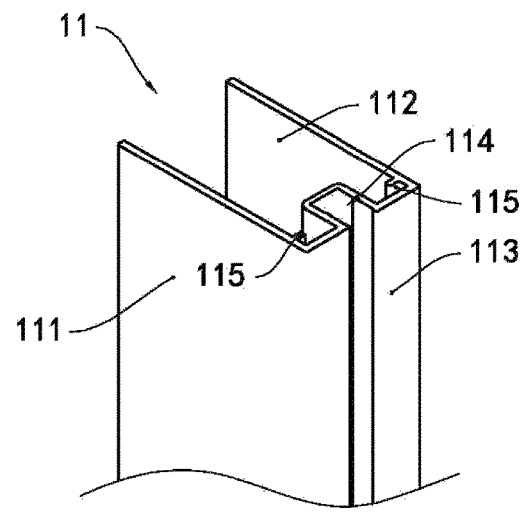
FIG. 5 is an enlarged view of a partial structure of an adjustable side frame of a shower door according to the first embodiment of the present invention.

Referring to FIG. 4, the fixed side frame 10 includes two side walls 101, 102 facing each other. A bottom wall 108 between the two side walls 101, 102 is provided with multiple through holes 103 and through holes 104. When installing the shower door, the screws pass through the through holes 104 to fix the fixed side frame 10 onto a wall surface. Referring to FIG. 5, the adjustable side frame 11 includes two side walls 111, 112 facing each other. A bottom wall 113 between the two side walls 111, 112 is provided with an installation groove 114 into which the glass panel 3 can be installed. In addition, position limiting blocks 115 are respectively provided to the inside of the side walls 111, 112, and form a position limiting groove with the bottom wall 113.

Figure 6:
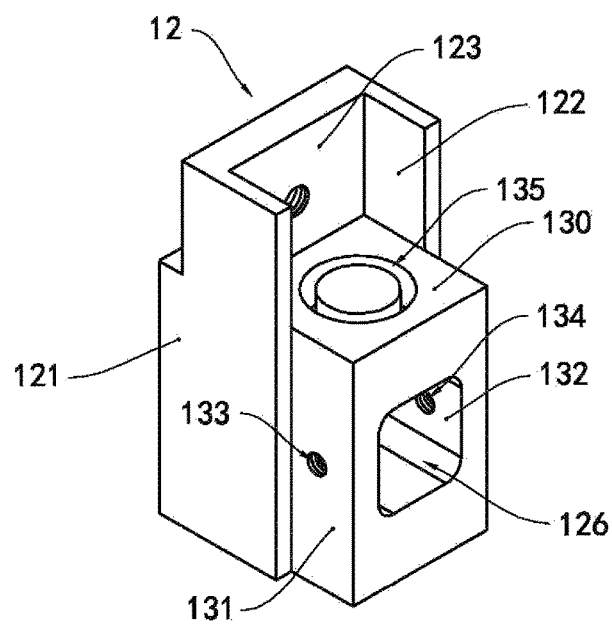
FIG. 6 is an enlarged structural view of a first fixing base according to the first embodiment of the present invention.
Figure 7:
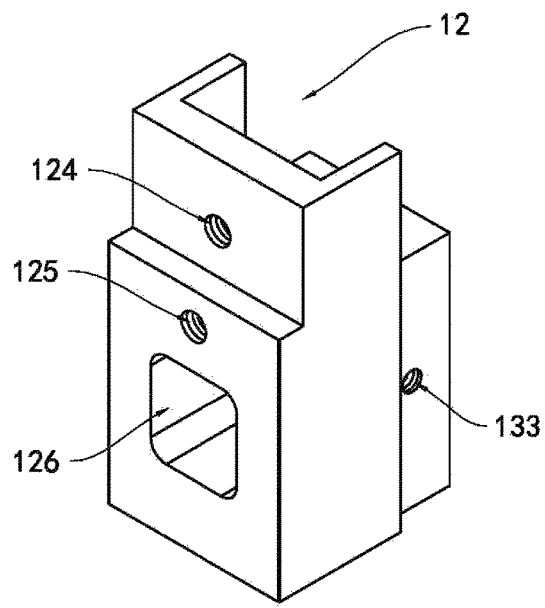
FIG. 7 is an enlarged structural view of a first fixing base according to the first embodiment of the present invention when seen from another view angle.

Referring to FIGS. 6-7, the first fixing base 12 comprises a pair of side walls 121, 122 and a bottom wall 123 connecting the side walls 121, 122 and provided with a threaded hole 124. One side of the first fixing base 12 is provided with a boss 130, at the middle of which is provided a substantially square through groove 126 and at one side of which is provided a threaded hole 125. A screw passing through the threaded hole 125 and the through holes 103 can fix the first fixing base 12 on the fixed side frame 11. Two side walls 131, 132 of the boss 130 of the first fixing base 12 are respectively provided with threaded holes 133, 134. Inside the boss 130 is provided a spring installation groove 135 in which a spring 185 is installed.

Figure 8:
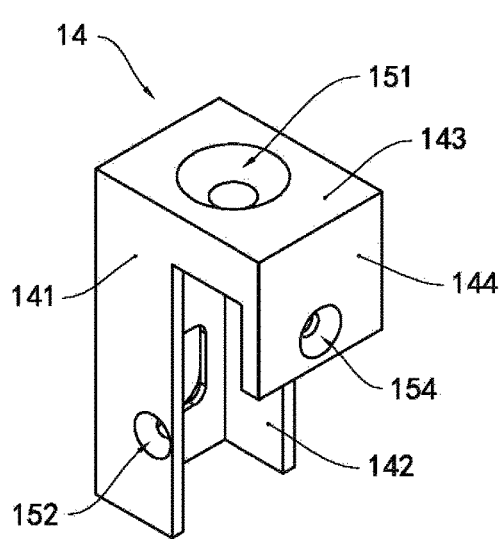
FIG. 8 is an enlarged structural view of a second fixing base according to the first embodiment of the present invention.
Figure 9:
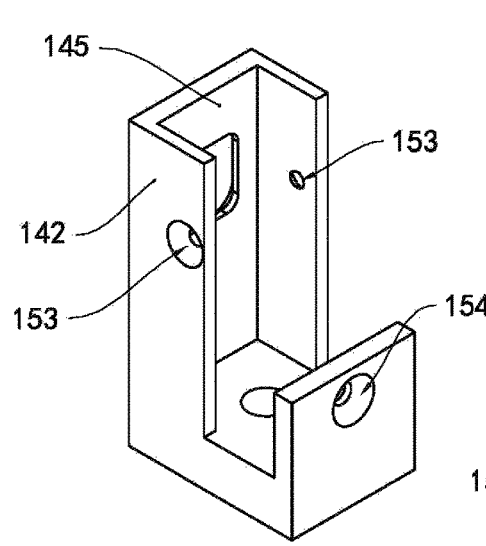
FIG. 9 is an enlarged structural view of a second fixing base according to the first embodiment of the present invention when seen from another view angle.
Figure 10:
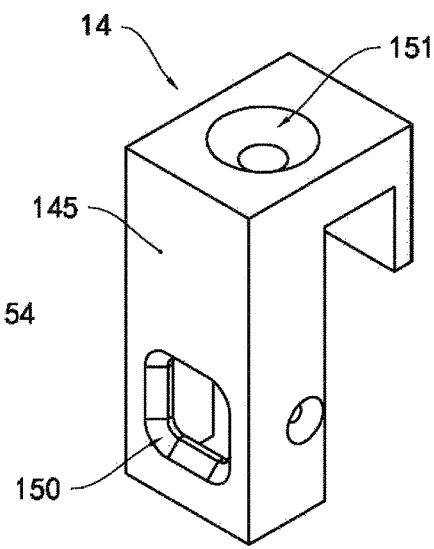
FIG. 10 is an enlarged structural view of a second fixing base according to the first embodiment of the present invention when seen from a third view angle.
Figure 15:
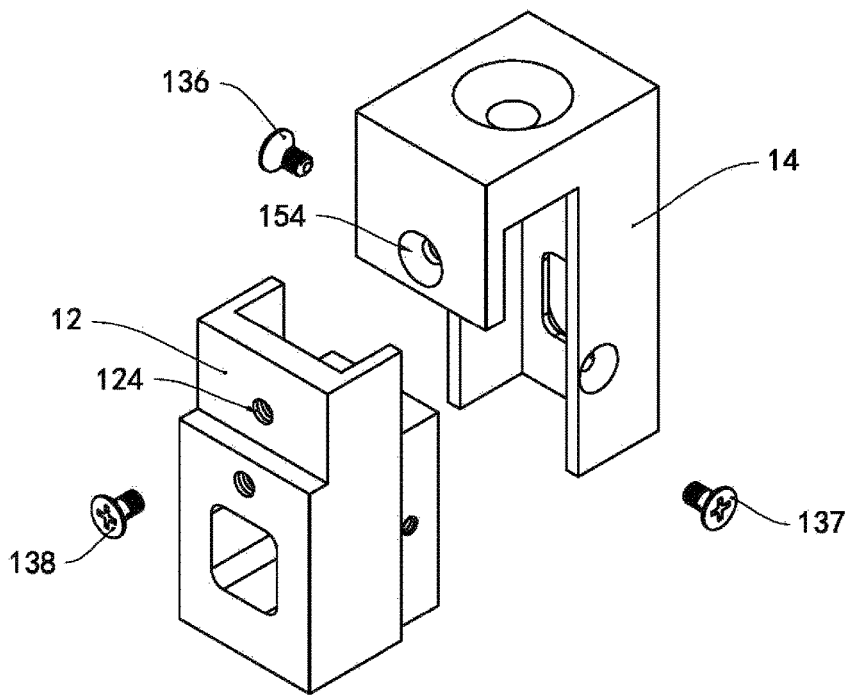
FIG. 15 is an enlarged structural view of a fixing base assembly of a shower door according to the first embodiment of the present invention.
Figures 16, 17:
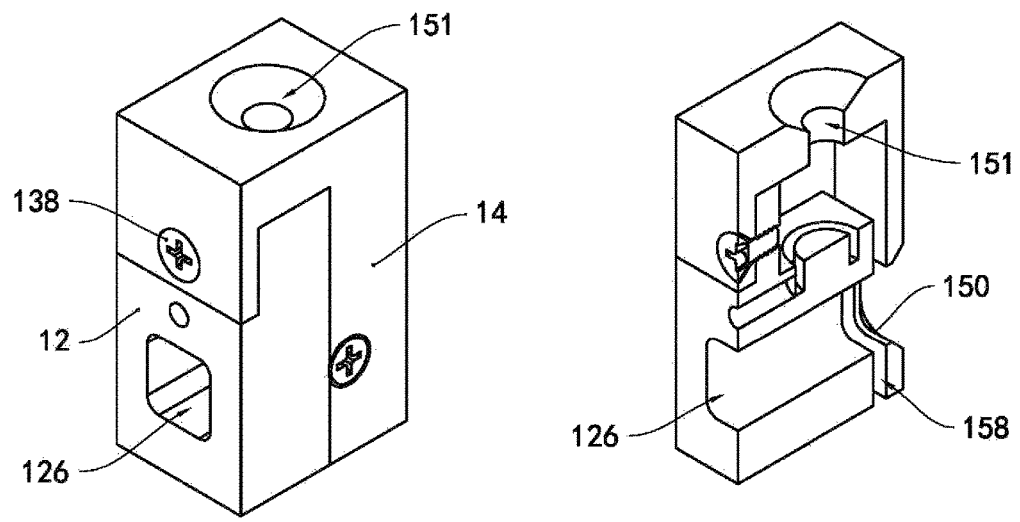
FIG. 16 is an enlarged exploded view of a fixing base assembly of a shower door according to the first embodiment of the present invention.
FIG. 17 is a perspective sectional view of a fixing base assembly of a shower door according to the first embodiment of the present invention.

Referring to FIGS. 8-10, the second fixing base 14 comprises a pair of side walls 141, 142, a top wall 143, a front wall 144 and a bottom wall 145. The side walls 141, 142, the top wall 143, and the front wall 144 are respectively provided with through holes 152, 153, 151 and 154. As shown by FIGS. 15-16, the second fixing base 14 is fixed on the first fixing base 12 by a screw 138 passing through the through hole 154 and the threaded hole 124, a screw 136 passing through the through hole 152 and the threaded hole 133 and a screw 137 passing through the through hole 153 and the threaded hole 132. In addition, the bottom wall 145 is provided with a through hole 150, which faces the through groove 126 and the outer side of the through hole 150 is provided with a chamfer.

Referring to FIGS. 11-12, a locking sheet 16 comprises a strip-shaped plate body 160, at the upper and lower ends of the plate body 160 are provided bosses 161, 162 respectively. The bosses 161, 162 are respectively provided with threaded holes 163, 169. In addition, the plate body 160 is provided with a locking hole 164, oblong holes 165, 166, 167 and a locking hole 168 from its upper portion to its lower portion. In this embodiment, the cross sections of the edges of the locking holes 164, 168 are trapezoidal. In application, the cross sections of the edges of the locking holes 164, 168 may be triangular, rectangular or in other shapes.

The boss 161 is installed in the fixing base assembly. That is, the boss 161 may be installed between the boss 130 of the first fixing base 12 and the top wall 143 of the second fixing base 14 in a vertical direction. The screw 18 passes through the threaded hole 163 and the through hole 151. Referring to FIG. 13, the screw 18 comprises a threaded post 180 in which an inner hexagonal blind hole 181 is provided so that an Allen key can rotate the screw 18. In addition, a lower end of the screw 18 is provided with a flat abutting portion 182 which may abut against the boss 130.

Figure 18:
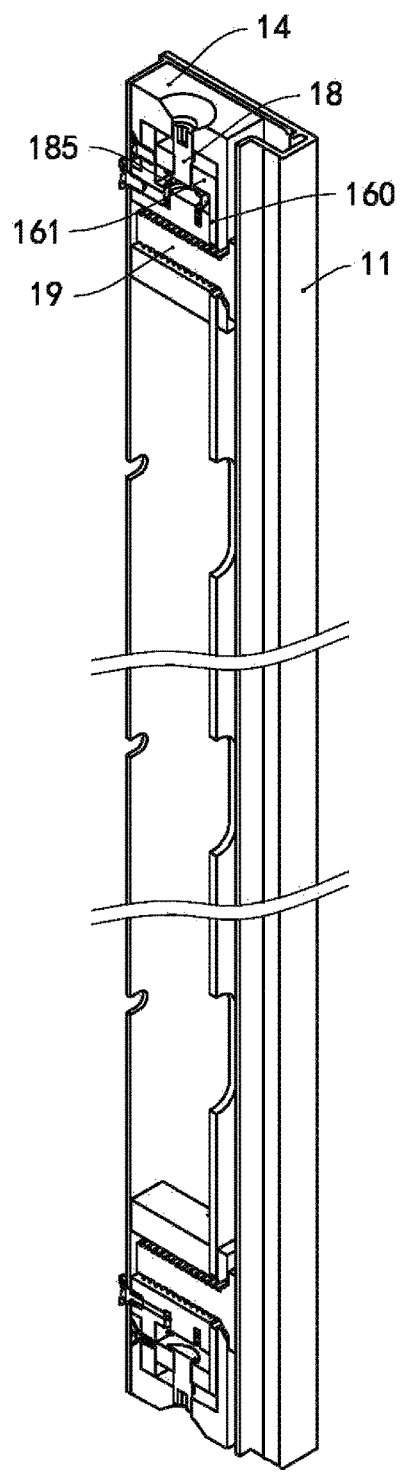
FIG. 18 is a perspective sectional view of a shower door according to the first embodiment of the present invention during installation.

Referring to FIGS. 17-18, after the second fixing base 14 is installed to the first fixing base 12, an installation groove 158 is formed between the first and second fixing bases 12, 14, and an upper end of the locking sheet 16 is installed in the installation groove 158.

Referring to FIG. 14, a connecting bar 19 comprises a connecting portion 190, at one end of the connecting portion 190 is provided a rack 195. The upper and lower ends of the rack 195 are respectively provided with multiple teeth 196, and a free end of the rack 195 is provided with a chamfer 197 to facilitate the rack 195 to pass through the locking hole 164 and extend into the through groove 126. Both ends at the outermost of the connecting portion 190 are respectively provided with position limiting blocks 191. When the connecting bar 19 is installed to the adjustable side frame 11, the position limiting blocks 191 are limited by the position limiting blocks 115 on the adjustable side frame 11, and are installed in the position limiting grooves, so that the connecting bar 19 is fixed to the adjustable side frame 11.

Figure 19:
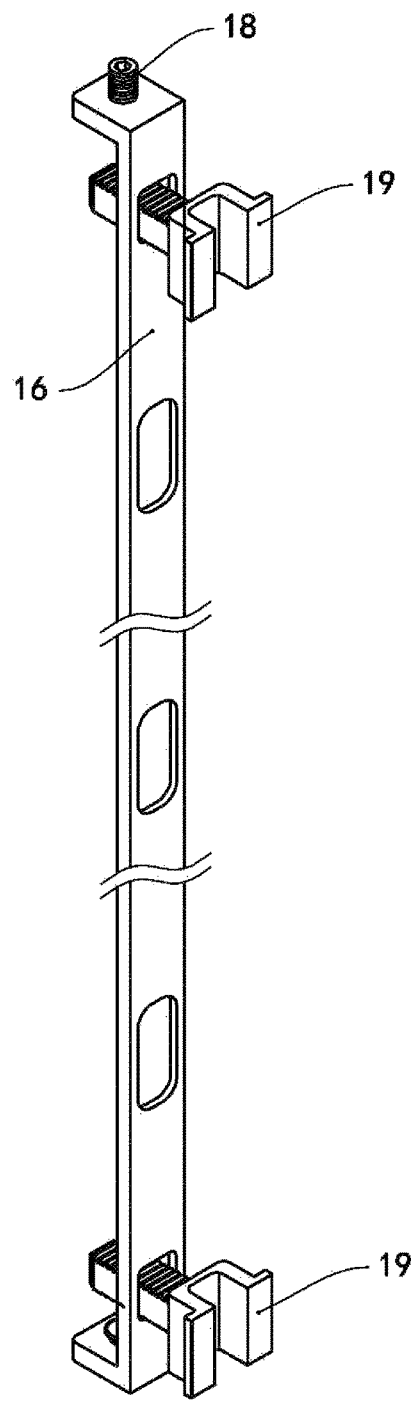
FIG. 19 is a structural view of a locking sheet and a screw of a shower door according to the first embodiment of the present invention during installation.

When assembling the shower door, the fixed side frame 10 is fixed to the wall surface first, and then the first fixing base 12 is fixed on the fixed side frame 10. The spring 185 is placed in the spring installation groove 135. The boss 161 of the locking sheet 16 is placed on the boss 130 of the first fixing base 12. The screw 18 passes through the threaded hole 162 of the locking sheet 16 and is rotated to the uppermost. Then, the second fixing base 14 is fixed on the first fixing base 12, and the screw 18 passes through the through hole 151. At this time, the adjustable side frame 11 mounted with the connecting bar 19 is installed to the fixed side frame 10, and the rack 195 of the connecting bar 19 passes through the locking hole 164 of the locking sheet 16, as shown in FIG. 19. As the boss 161 of the locking sheet 16 is applied with an upward force by the spring 185, the connecting bar 19 can freely pass through the locking hole 164, and can be inserted into the through groove 126. To facilitate rotation of the screw 18 by installation persons, the through hole 151 is designed to have an inverted taper shape. That is, a diameter of the cross section of the through hole 151 facing the upper surface of the top wall 143 is greater than that of the cross section of the through hole facing the lower surface of the top wall 143.

After the glass panel 3 is adjusted to the right position, the screw 18 is rotated downwards. The screw 18 moves downwards, and the abutting portion 182 abuts against the upper surface of the boss 130. As the screw 18 continues to move downwards, the locking sheet 16 moves upwards relative to the adjustable side frame 11, and the edge of the locking hole 164 is inserted into the teeth 196 of the rack 195, thereby fixing the adjustable side frame 11.

The lower end of the fixed side frame 10 is also provided with a fixing base assembly, the installation manner thereof is the same as that of the fixing base assembly located at the upper end of the fixed side frame 10. Therefore, the installation process is omitted.

When loosening the adjustable side frame 11, it only needs to rotate the screw 18 in an opposite direction. The boss 161 of the locking sheet 16 is restored to its original position under the elastic restoring force of the spring 185, so that the connecting bar 19 can be plugged out of the locking hole 164, and the adjustable side frame 11 can be adjusted again or can be detached from the fixed side frame 10.

Embodiment 2

Figure 20:
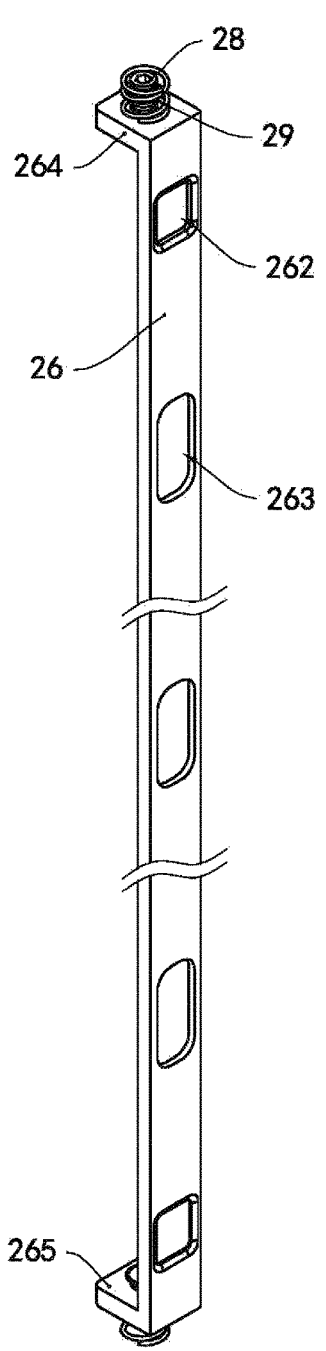
FIG. 20 is a structural view of a locking sheet, a screw and a spring of a shower door according to a second embodiment of the present invention.

The shower door of this embodiment comprises a fixed side frame and an adjustable side frame. A fixing base assembly is fixed on the fixed side frame, and comprises a first fixing base and a second fixing base. The upper and lower ends of the locking sheet are respectively mounted to the fixing base assembly. Referring to FIG. 20, the upper and lower ends of the locking sheet 26 are respectively provided with bosses 264, 265. The boss 264 is provided with a threaded hole through which a screw 28 passes, and a spring 29 is fitted over the screw 28. The upper and lower ends of the locking sheet 26 are respectively provided with locking holes 262, and the middle of the plate body is provided with multiple through holes 263.

The spring 29 of this embodiment is also provided in the fixing base assembly. Different from the first embodiment, the spring 29 of this embodiment is disposed above the boss 264. That is, the two ends of the spring 29 respectively abut against the lower surface of the top wall of the second fixing base and the upper surface of the boss 264. Correspondingly, another spring is provided below the boss 265.

Embodiment 3

Figure 21:
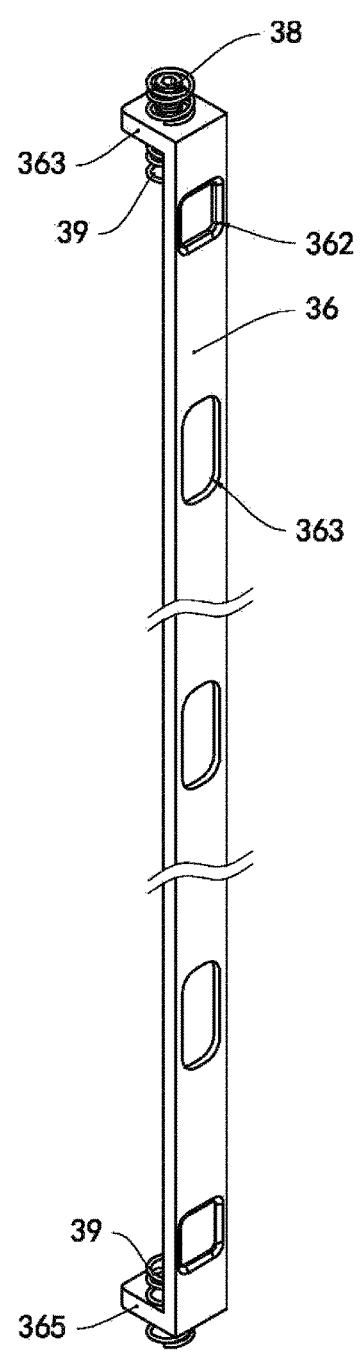
FIG. 21 is a structural view of a locking sheet, a screw and a spring of a shower door according to a third embodiment of the present invention.

The shower door of this embodiment comprises a fixed side frame and an adjustable side frame. A fixing base assembly is fixed on the fixed side frame, and comprises a first fixing base and a second fixing base. The upper and lower ends of the locking sheet are respectively mounted to the fixing base assembly. Referring to FIG. 21, the upper and lower ends of the locking sheet 36 are respectively provided with bosses 263, 365. The boss 363 is provided with a threaded hole through which a screw 38 passes, and a spring 39 is fitted over the screw 38. The upper and lower ends of the locking sheet 36 are respectively provided with locking holes 362, and the middle of the plate body is provided with multiple through holes 363.

Springs 39 of this embodiment are also provided in the fixing base assembly. Different from the first embodiment, the springs 39 of this embodiment are respectively disposed above the boss 363 and below the boss 363. Correspondingly, springs 39 are also provided above and below the boss 365.

Embodiment 4

Figure 22:
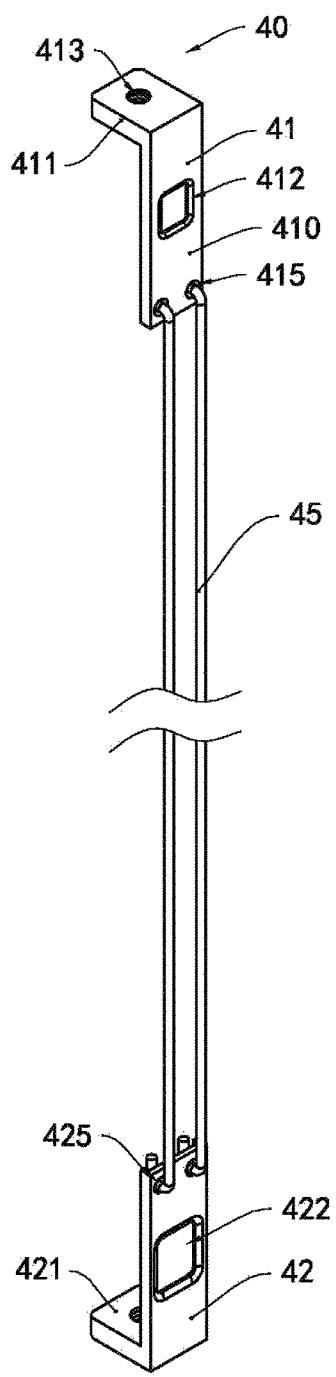
FIG. 22 is a structural view of a locking sheet of a shower door according to a fourth embodiment of the present invention.

The shower door of this embodiment comprises a fixed side frame and an adjustable side frame. A fixing base assembly is fixed on the fixed side frame, and comprises a first fixing base and a second fixing base. The upper and lower ends of the locking sheet are respectively mounted to the fixing base assembly. Referring to FIG. 22, the locking sheet 40 of this embodiment comprises a first locking sheet 41 at an upper end and a second locking sheet 42 at a lower end. The first locking sheet 41 comprises a plate body 410, the upper end of the plate body 410 is provided with a boss 411 and a locking hole 412 is provided on the plate body 410. The boss 411 is provided with a threaded hole 413 through which a screw can pass. In addition, two through holes 415 are provided at a lower end of the plate body 410.

The second locking sheet 42 is also provided with a boss 421 on which a threaded hole is provided. The second locking sheet 42 is further provided with a locking hole 422. Two through holes 425 are provided at an upper end of the second locking sheet 42.

The locking sheet 40 of this embodiment is provided with a connecting member for connecting the first and second locking sheets 41, 42. The connecting member of this embodiment is two steel wires 45. Both ends of each steel wire 45 are provided with hooks respectively. The hook at an upper end hooks the through hole 415, and the hook at a lower end hooks the through hole 425, thereby realizing the connection between the first and second locking sheets 41, 42. In this way, material of the locking sheet can be saved, and installation of the first and second locking sheets 41, 42 at the upper and lower ends can be realized conveniently.

Embodiment 5

Figure 23:
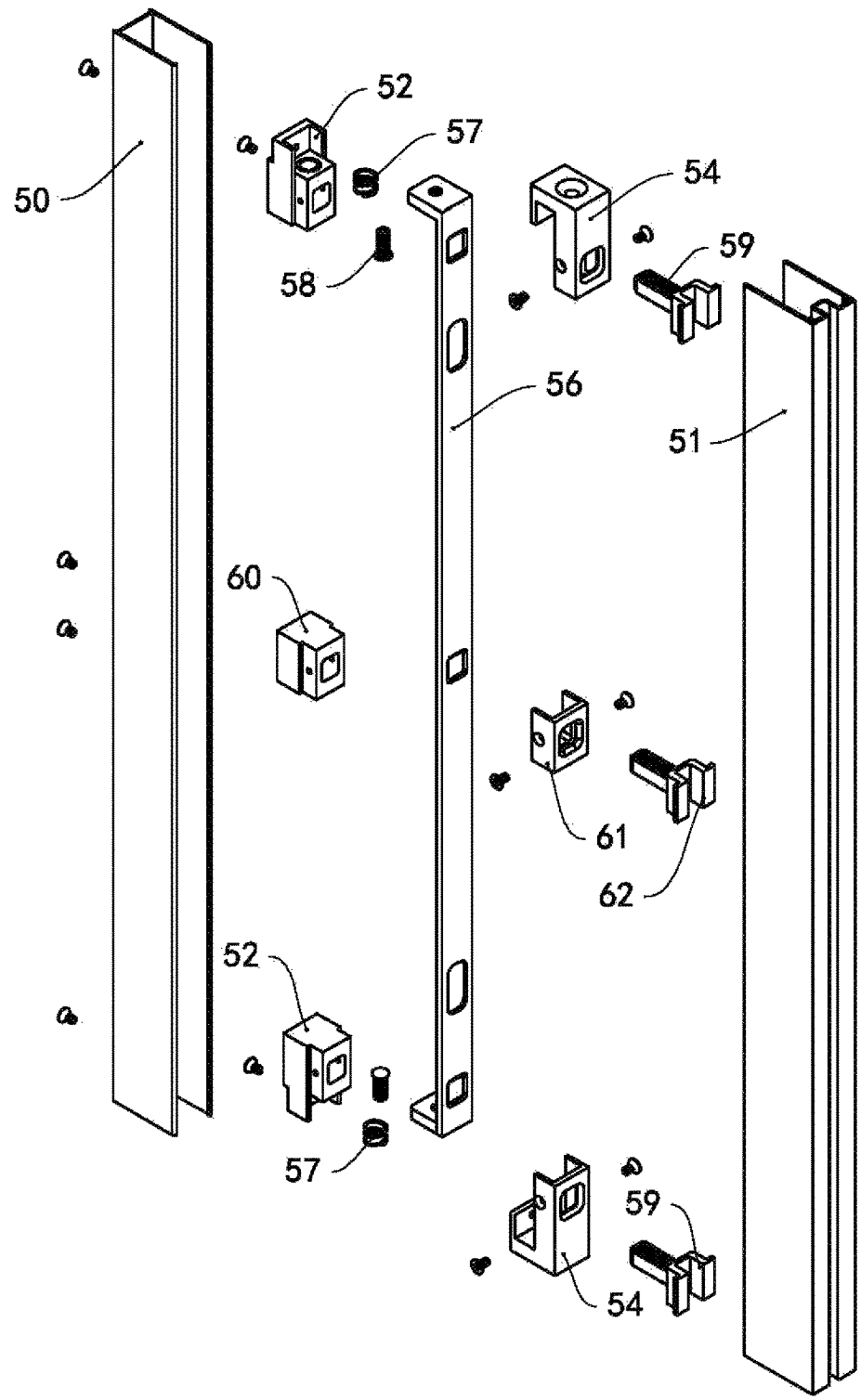
FIG. 23 is an exploded view of a shower door according to a fifth embodiment of the present invention.

Referring to FIG. 23, the shower door of this embodiment comprises a fixed side frame 50 and an adjustable side frame 51. A glass panel is installed within the adjustable side frame 51. First fixing base assemblies are fixed on the upper and lower ends of the fixed side frame 50 respectively. Each of the first fixing base assembly comprises a first fixing base 52 and a second fixing base 54. The two ends of the locking sheet 56 are located within the two first fixing base assemblies respectively. In this embodiment, in addition to the first fixing base assemblies, a second fixing base assembly is also provided. The second fixing base assembly comprises a third fixing base 60 and a fourth fixing base 61. Therefore, the locking sheet 56 is provided with three locking holes. Referring to FIG. 24, the upper and lower ends of the locking sheet 56 are provided with bosses 562, 563 respectively. The bosses 562, 563 are provided with threaded holes 564 respectively. The locking sheet 56 is provided with a locking hole 565, a through hole 566, a locking hole 567, a through hole 568 and a locking hole 569 from its upper portion to its lower portion.

Referring to FIGS. 25-26, the third fixing base 60 comprises a body 601. One side of the body 601 is provided with a boss 602, the middle of the boss 602 is provided with a through groove 603 and the two sides of the boss 602 are respectively provided with threaded holes 604.

Figure 27:
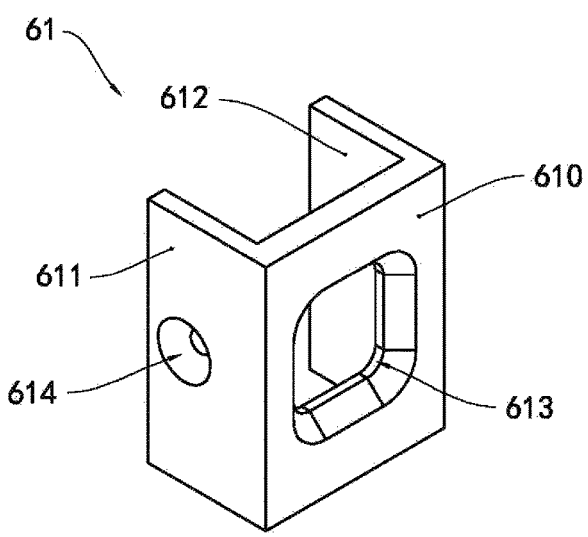
FIG. 27 is an enlarged structural view of a fourth fixing base of a shower door according to the fifth embodiment of the present invention.
Figure 28:
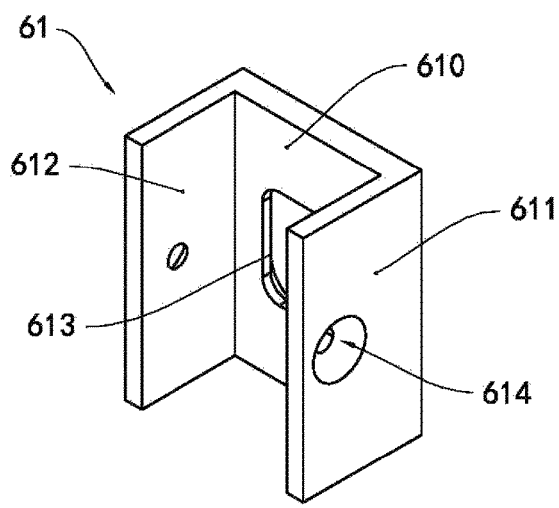
FIG. 28 is an enlarged structural view of a fourth fixing base of a shower door according to the fifth embodiment of the present invention when seen from another view angle.

Referring to FIGS. 27-28, the fourth fixing base 61 comprises a pair of side walls 611, 612 and a bottom wall 610 connecting the side walls 611, 612. The bottom wall 610 is provided with a through hole 613, which preferably has a chamfer. In addition, through holes 614 are provided to the side walls 611, 612 respectively. When the fourth fixing base is mounted to the third fixing base 60, screws pass the through holes 614 and are screwed in the threaded holes 604.

A connecting bar 59 may be fixed on the adjustable side frame 51, and is provided with a rack including multiple teeth. The rack may pass through the locking holes 565, 569 of the locking sheet 56 and may be inserted into the through hole 603.

To accommodate the use of the second fixing base assembly, another connecting bar 62 is fixed on the adjustable side frame 51. The structure of the connecting bar 62 is the same as that of the connecting bar 59, and will not be elaborated.

Figure 29:
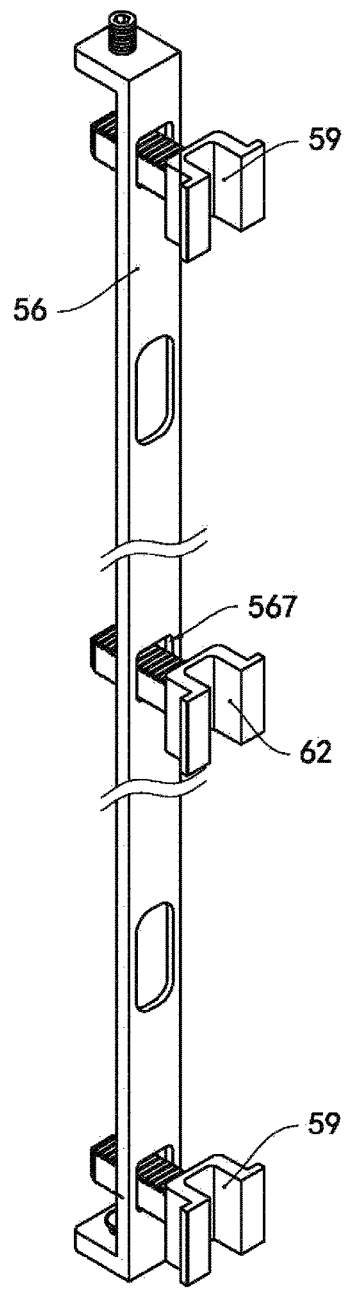
FIG. 29 is a structural view of a locking sheet, a connecting bar and a screw of a shower door according to the fifth embodiment of the present invention.

When assembling the shower door, the first and second fixing base assemblies are fixed on the fixed side frame 50, and the connecting bars 59, 62 are fixed on the adjustable side frame 51. At this time, the screw 58 is adjusted to a position closest to the bosses 562, 563 of the locking sheet 56. Then, the connecting bars 59, 62 pass through the locking holes 565, 567, 569, as shown in FIG. 29. By rotating the screw 58, the locking sheet 56 moves upwards relative to the fixed side frame 50, and the racks are locked by the locking holes 565, 567, 569, thereby fixing the fixed side frame 50 with the adjustable side frame 51.

Of course, the present invention may have more variations in application. For example, the positions of the fixed side frame and the adjustable side frame may be switched. That is, the object of the present invention may be realized using the following solution: the fixing base assembly/assemblies may be disposed on the adjustable side frame, and the connecting bar(s) may be fixed on the fixed side frame.

INDUSTRIAL APPLICABILITY

As can be seen from the above assembling process, the assembling of the shower door is very simple and does not require drilling on the side frames. The distance between the adjustable side frame and the fixed side frame can be adjusted at will according to the inclination condition of the wall surface. The assembling is simple and fast and does not damage the side frames, thereby maintaining a beautiful appearance of the side frames and preventing damages to the side frames.

The shower door of the present invention is applicable for on-site assembling in customers' bathrooms. By applying the products of the present invention, installation operations of the shower door are simple, and it does not need screws to fix and connect the tracks with an included angle therebetween. Therefore, installation of the shower door requires less time and less labor from installation persons, thereby realizing quick and easy installation of the shower door and reducing the production and assembling cost thereof.

The invention claimed is:

1. A shower door adjusting device, comprising:
   a first side frame and a second side frame, one of the first side frame and the second side frame is a fixed side frame and the other of the first side frame and the second side frame is an adjustable side frame; characterized in that:
   a first fixing base assembly including a first fixing base and a second fixing base, wherein the first fixing base is fixed on the first side frame, the second fixing base is detachably fixed on the first fixing base, an installation groove is formed between the first and second fixing bases, and the first fixing base assembly is provided with a first through groove therein;
   a locking sheet having an end provided with a boss, wherein the end of the locking sheet is installed in the installation groove, the locking sheet is provided with a first locking hole which faces the first through groove, a spring abutting against the boss is provided in the first fixing base assembly, the boss is provided with a threaded hole, a screw passing through the threaded hole is provided to the first fixing base assembly, and one end of the screw close to the first fixing base is provided with an abutting portion; and
   a first connecting bar fixed to the second side frame and provided with a first rack passing through the first locking hole and the first through groove, wherein the first rack is locked within the first locking hole after the abutting portion of the screw abuts against the first fixing base.

2. The shower door adjusting device according to claim 1, wherein the spring(s) is/are disposed above and/or below the boss of the locking sheet.

3. The shower door adjusting device according to claim 1, wherein there are two first fixing base assemblies, which are respectively disposed at upper and lower ends of the first side frame; and
   both ends of the locking sheet are respectively provided with one of the bosses, and two of the bosses are respectively disposed within the two of the first fixing base assemblies.

4. The shower door adjusting device according to claim 3, wherein the locking sheet comprises a first locking sheet and a second locking sheet which are respectively located at an upper end and a lower end thereof and are connected by a connecting member.

5. The shower door adjusting device according to claim 3, wherein at the middle of the first side frame is provided with a second fixing base assembly including a third fixing base and a fourth fixing base, wherein the third fixing base is fixed on the first side frame, the fourth fixing base is detachably fixed on the third fixing base, and the second fixing base assembly is provided with a second through groove;
   the middle of the locking sheet passes through the second fixing base assembly and is provided with a second locking hole facing the second through groove; and
   on the second side frame is fixed a second connecting strip, which is provided with a second rack passing through the second through groove and locked by the second locking hole.

6. The shower door adjusting device according to claim 1, wherein a top wall of the second fixing base is provided with a through hole, through which one end of the screw passes and which is in the shape of an inverted taper.

7. The shower door adjusting device according to claim 1, wherein a cross section of an edge of the first locking hole is in the shape of a rectangle, a triangle, a trapezoid, or a zigzag.

8. The shower door adjusting device according to claim 1, wherein a chamfer is provided at a free end of the first rack.

9. A shower door, comprising:
   a first side frame and a second side frame, one of the first side frame and the second side frame is a fixed side frame and the other of the first side frame and the second side frame is an adjustable side frame; and a glass panel installed on the adjustable side frame;

the shower door being characterized by further comprising:

a first fixing base assembly including a first fixing base and a second fixing base, wherein the first fixing base is fixed on the first side frame, the second fixing base is detachably fixed on the first fixing base, an installation groove is formed between the first and second fixing bases, and the first fixing base assembly is provided with a first through groove therein;

a locking sheet having an end provided with a boss, wherein the end of the locking sheet is installed in the installation groove, the locking sheet is provided with a first locking hole which faces the first through groove, a spring abutting against the boss is provided to the first fixing base assembly, the boss is provided with a threaded hole, a screw passing through the threaded hole is provided to the first fixing base assembly, and one end of the screw close to the first fixing base is provided with an abutting portion; and a first connecting bar fixed to the second side frame and provided with a first rack passing through the first locking hole and the first through groove, wherein the first rack is locked within the first locking hole after the abutting portion of the screw abuts against the first fixing base.

10. The shower door according to claim 9, wherein at the middle of the first side frame is provided with a second fixing base assembly including a third fixing base and a fourth fixing base, wherein the third fixing base is fixed on the first side frame, the fourth fixing base is detachably fixed on the third fixing base, and the second fixing base assembly is provided with a second through groove;

the middle of the locking sheet passes through the second fixing base assembly and is provided with a second locking hole facing the second through groove; and on the second side frame is fixed a second connecting strip, which is provided with a second rack passing through the second through groove and locked by the second locking hole.

* * * * *